(12) United States Patent
An

(10) Patent No.: US 8,184,612 B2
(45) Date of Patent: May 22, 2012

(54) METHOD AND APPARATUS FOR MANAGING HYPER FRAME NUMBER FOR CIPHERING/DECIPHERING IN MOBILE COMMUNICATION SYSTEM

(75) Inventor: Gu-Lee An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 627 days.

(21) Appl. No.: 12/364,204

(22) Filed: Feb. 2, 2009

(65) Prior Publication Data

US 2009/0196422 A1    Aug. 6, 2009

(30) Foreign Application Priority Data

Feb. 4, 2008   (KR) ..................... 10-2008-0011185

(51) Int. Cl.
*H04W 4/00*     (2009.01)
*H04W 36/00*    (2009.01)
*H04J 3/24*     (2006.01)
*H04J 3/06*     (2006.01)
*H04M 1/66*     (2006.01)
*H04M 3/16*     (2006.01)
*H04M 1/68*     (2006.01)
*H04K 1/00*     (2006.01)

(52) U.S. Cl. ........ 370/350; 370/328; 370/349; 370/509; 455/410; 455/411; 455/436; 380/247; 380/273; 380/274

(58) Field of Classification Search ...................... None
See application file for complete search history.

(56) References Cited

U.S. PATENT DOCUMENTS

| | | | |
|---|---|---|---|
| 7,039,407 B2 * | 5/2006 | Sipila et al. | 455/436 |
| 7,085,294 B2 * | 8/2006 | Longoni et al. | 370/509 |
| 7,126,936 B2 * | 10/2006 | Herrmann et al. | 370/350 |
| 2004/0013105 A1 * | 1/2004 | Ahmavaara et al. | 370/349 |

* cited by examiner

*Primary Examiner* — Anh-Vu H Ly
*Assistant Examiner* — Diane Lo
(74) *Attorney, Agent, or Firm* — Jefferson IP Law, LLP

(57) ABSTRACT

A method and an apparatus for managing an HFN for ciphering/deciphering at an RNC of a mobile communication system are provided. In the method, a Timing Adjustment (ToA) value is received from a base station, and a Connection Frame Number (CFN) is corrected. Whether correction of the CFN has been generated within the same cycle is determined by comparing the correction CFN with an absolute CFN serving as a reference. An HFN value is changed or maintained depending on whether the CFN correction has been generated within the same cycle.

20 Claims, 9 Drawing Sheets

US 8,184,612 B2

METHOD AND APPARATUS FOR MANAGING HYPER FRAME NUMBER FOR CIPHERING/DECIPHERING IN MOBILE COMMUNICATION SYSTEM

PRIORITY

This application claims the benefit under 35 U.S.C. §119 to a Korean patent application filed in the Korean Intellectual Property Office on Feb. 4, 2008 and assigned Serial No. 10-2008-0011185, the entire disclosure of which is hereby incorporated by reference.

BACKGROUND OF THE INVENTION

1. Field of the Invention

The present invention relates to a method and an apparatus for managing a Hyper Frame Number (referred to as an 'HFN' hereinafter) for ciphering/deciphering in a mobile communication system. More particularly, the present invention relates to a method and an apparatus for changing an HFN using a Connection Frame Number (referred to as an 'CFN' hereinafter) correction value and a CFN offset value generated due to unstable delay in an Iub section between a Radio Network Controller (referred to as an 'RNC' hereinafter) and a base station (node B) in a mobile communication system.

2. Description of the Related Art

According to a 3rd Generation Partnership Project (3GPP) standard, ciphering/deciphering for a Radio Link Control (referred to as an 'RLC' hereinafter) of a transparent mode is performed at a Media Access Control-dedicated (MAC-d). Ciphering/deciphering functions use a COUNT-C, which is a ciphering sequence number. FIG. 1 is a diagram illustrating a construction of a conventional COUNT-C as suggested by 3GPP TS. As illustrated in FIG. 1, the COUNT-C includes an HFN 101 and a CFN 103.

The HFN forming the COUNT-C is set to a MAC-d of a system and a MAC-d of a terminal when a call is established by the terminal in the system. The HFN increases by 1 whenever one cycle of the CFN elapses. Here, the CFN increases by 1 every 10 ms, and has a value between 0 and 255. A range between 0 and 255 is called one cycle.

After the call is established, a delay is generated in a section (Iub) between an RNC of a system and a base station (node B), the RNC can receive a time adjustment request from the base station and change a CFN.

However, since the ciphering process performs a ciphering activation time check and manages the HFN value using the CFN, correction of the CFN occurs frequently due to the timing adjustment requests in the system, it is difficult to maintain the same HFNs of the system and the terminal. Here, the ciphering activation time denotes a time point after which the HFN value can be increased according to the cycle of the CFN. That is, before the ciphering activation time, the HFN maintains the substantially same value even when the cycle of the CFN changes. After the ciphering activation time, the HFN can increase when the cycle of the CFN changes. A terminal determines the ciphering activation time with consideration of a margin of about 2000 ms, and informs the RNC of the determined ciphering activation time.

For example, assuming that a CFN of a point at which the RNC receives a ciphering control is 140, a ciphering activation time is 80, and an HFN is 20, when a delay of downlink frame is generated at a point when a CFN is 148 and the downlink frame deviates from a reception window, a base station requests the RNC to perform a time adjustment. Then, the RNC corrects the CFN to 70 according to the request of the base station, and retransmits the downlink frame. At this point, after 100 ms, the correction CFN increases to 80 and becomes the ciphering activation time. Therefore, the RNC increases the HFN to 21 at the next cycle after the current CFN cycle.

As described above, when the CFN is corrected to a previous CFN before the ciphering activation time due to the time adjustment procedure, the HFN is changed. Accordingly, a difference between the HFN of the system and the HFN of the terminal is generated unintentionally.

That is, when an HFN is used as described above, in the case where a delay of an Iub section is not constant and correction of a CFN is frequently generated, a time used for ciphering/deciphering of a specific HFN value may be lengthened or shortened abnormally. For example, as illustrated in FIG. 2, two occurrences of time adjustment procedures are generated due to instability in a delay of the Iub section and a CFN is corrected (201 and 203), so that 78 (205) may be used as an HFN value for an abnormally long time. When this process is repeatedly generated, the HFN of the RNC and the HFN of the terminal do not coincide with each other. Such mismatch of the HFNs may generate a gabbling phenomenon that a user's data is transferred in so fast that a counterpart cannot understand the data. Accordingly, there is a need for an improved apparatus and method for managing an HFN for ciphering/deciphering in a mobile communication system.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for managing an HFN for ciphering/deciphering in a mobile communication system.

Another aspect of the present invention is to provide a method and an apparatus for maintaining the same HFNs of a system and a terminal even when a CFN is frequently corrected due to a delay in an Iub section between an RNC and a base station (node B) in a mobile communication system.

Still another aspect of the present invention is to provide a method and an apparatus for changing an HFN with consideration of the cycle of a correction CFN when CFN correction is generated in a mobile communication system.

Yet another aspect of the present invention is to provide a method and an apparatus for changing an HFN using a CFN correction value and a CFN offset value in a mobile communication system.

In accordance with an aspect of the present invention, a method for managing a Hyper Frame Number (HFN) for ciphering/deciphering at a Radio Network Controller (RNC) of a mobile communication system is provided. The method includes receiving a Timing Adjustment (ToA) value from a base station, correcting a Connection Frame Number (CFN), determining whether correction of the CFN has been generated within the same cycle by comparing the correction CFN with an absolute CFN serving as a reference, and changing or maintaining an HFN value depending on whether the CFN correction has been generated within the same cycle.

In accordance with another aspect of the present invention, an apparatus for managing a Hyper Frame Number (HFN) for ciphering/deciphering at a Radio Network Controller (RNC) of a mobile communication system is provided. The apparatus includes a Timing Adjustment ToA receiver for receiving a ToA value for correcting a Connection Frame Number (CFN) from a base station, and a ciphering processor for determining whether CFN correction has been generated within the same cycle using a correction CFN and an absolute CFN serving as a reference, and for performing ciphering of downlink data by changing or maintaining an HFN value depending on the determination.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

Figure 1:
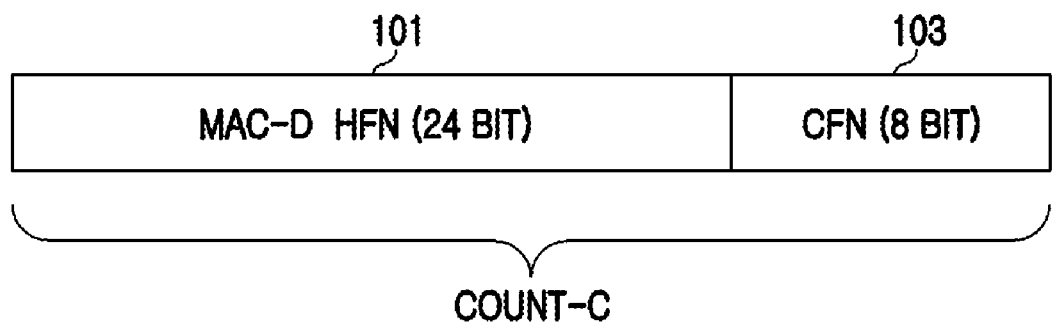
FIG. 1 is a diagram illustrating a construction of a conventional COUNT-C as suggested by 3GPP TS.
Figure 2:
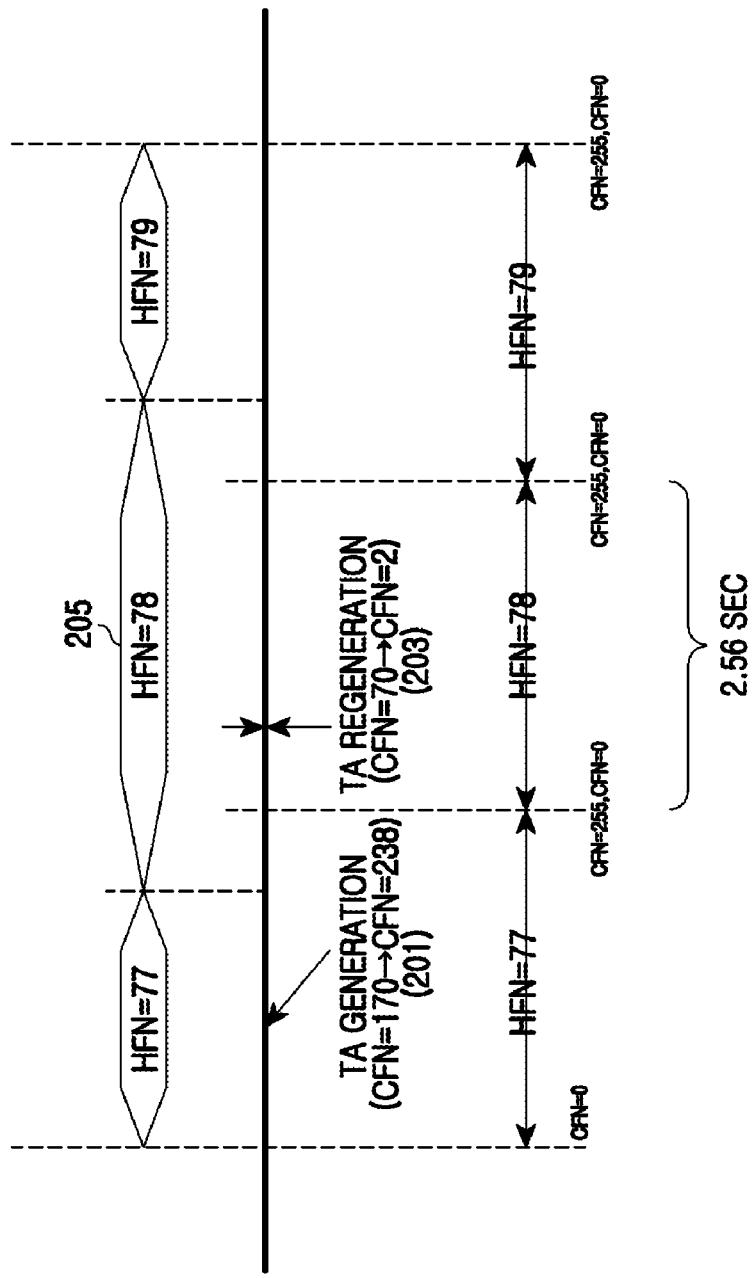
FIG. 2 is a diagram illustrating an HFN changed depending on a CFN value corrected in a conventional mobile communication system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus in a mobile communication system for changing an HFN using a CFN correction value and a CFN offset value. In an exemplary implementation, the CFN correlation value is generated because a delay in an Iub section between an RNC and a base station (node B) is unstable.

Hereinafter, an exemplary method of changing and managing an HFN according to a correction CFN in a case where, after a synchronization procedure between an RNC and a base station is performed to set a CFN and an HFN, a downlink data frame transmitted by the RNC deviates from a reception window of the base station during data transmission so that the RNC receives a timing adjustment control frame from the base station to perform CFN correction, will be described. Also, an exemplary embodiment will be described in which the RNC classifies the CFN and the HFN into two groups, and manages them. One group includes an absolute CFN (abs CFN) that increases every 10 ms regardless of generation of a Timing Adjustment (ToA), and an absolute HFN (abs HFN) that increases according to the absolute CFN. The other group includes a transmission CFN (tx CFN) corrected depending on the generation of the ToA and used for actual ciphering, and a transmission HFN (tx HFN) that changes according to the transmission CFN. That is, the absolute CFN increases by 1 every 10 ms regardless of CFN correction, and the absolute HFN increases by 1 whenever one cycle of the absolute CFN elapses. However, the transmission CFN is corrected by reception of a timing adjustment control frame, and the transmission HFN is changed or maintained according to an exemplary method of the present invention. In an exemplary implementation, the transmission HFN is represented by a sum of the absolute HFN and an offset. In the description below, an "estimated CFN" (est CFN) denotes a value estimated as a transmission CFN to be used for ciphering at the next point in the case where the CFN is not corrected.

Figure 3:
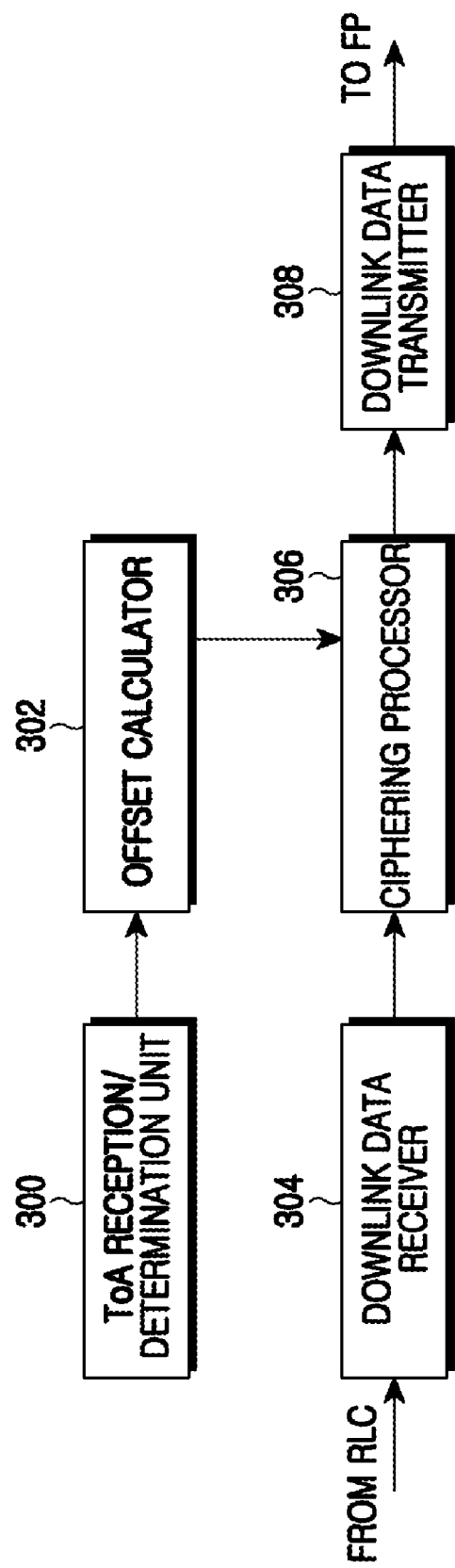
FIG. 3 is a block diagram illustrating a construction of an RNC for managing an HFN in a mobile communication system according to an exemplary embodiment of the present invention.

FIG. 3 is a block diagram illustrating a construction of an RNC for managing an HFN in a mobile communication system according to an exemplary embodiment of the present invention.

Referring to FIG. 3, the RNC includes a ToA reception/determination unit 300, an offset calculator 302, a downlink data receiver 304, a ciphering processor 306, and a downlink data transmitter 308.

When a transmitted downlink data frame deviates from a reception window of a base station during downlink data transmission, the ToA reception/determination unit 300 receives a timing adjustment control frame from the base station, obtains a ToA value from the timing adjustment control frame, and provides the obtained ToA value to the offset calculator 302.

The offset calculator 302 receives the ToA value from the ToA reception/determination unit 300, determines an offset between a correction CFN and an absolute CFN, and provides the determined offset to the ciphering processor 306. That is, the offset calculator 302 determines a CFN correction value using the ToA, and determines an estimated CFN (est CFN) to be used as a transmission CFN at the next point in the case where the CFN correction is not generated. Here, the offset calculator 302 determines the est CFN using Equation (1) below.

$$estCFN = (256 + absCFN + prevOffset) \% 256 \quad (1)$$

In Equation (1), 256 denotes one cycle of a CFN, absCFN denotes an absolute CFN obtained by performing synchronization, and prevOffset denotes an offset of a previous point.

In an exemplary implementation, the offset calculator 302 determines the offset in a different way depending on whether the ToA value is a positive number or a negative number, and depending on a size comparison result of the estimated CFN and the correction CFN. That is, when the ToA value is a positive number and the estimated CFN is less than the correction CFN, the offset calculator 302 determines an offset using Equation (2) below. When the ToA value is a positive number and the estimated CFN is greater than or equal to the correction CFN, the offset calculator 302 determines an offset using Equation (3). Here, when the correction CFN is less than or equal to the estimated CFN, indicating that the downlink data frame arrives before a reception window, it indicates that the correction CFN is a value corresponding to the substantially same cycle. Therefore, the current transmission HFN is maintained.

On the other hand, when the ToA value is a negative number and the estimated CFN is greater than the correction CFN, the offset calculator 302 determines an offset using Equation (4) below. When the ToA value is a negative number and the estimated CFN is less than or equal to the correction CFN, the offset calculator 302 determines an offset using Equation (5) below.

$$Offset = prevOffset - (estCFN + 256 - txCFN) \quad (2)$$

$$Offset = prevOffset - (estCFN - txCFN) \quad (3)$$

$$Offset = prevOffset + (estCFN + 256 - txCFN) \quad (4)$$

$$Offset = prevOffset + (estCFN - txCFN) \quad (5)$$

In Equations (2)-(5), prevOffset denotes an offset of a previous point, estCFN denotes an estimated CFN, 256 denotes one cycle of a CFN, and txCFN denotes a correction CFN value, that is, a transmission CFN.

The offset calculator 302 provides the determined offset to the ciphering processor 306, and examines whether the calculated offset is a value within a range set in advance. When the determined offset is a value outside the range set in advance, the offset calculator 302 updates the offset and the absolute HFN. In an exemplary implementation, when the calculated offset is a value within −256~256, which is the range set in advance, the offset calculator 302 sets the above offset as a previous offset, and maintains the absolute HFN. On the other hand, when the determined offset is a value less than or equal to −256, the offset calculator 302 sets, as a previous offset, a value obtained by adding 256 to the offset, and decreases the absolute HFN by 1. Also, when the determined offset is a value greater than or equal to 256, the offset calculator 302 sets, as a previous offset, a value obtained by subtracting 256 from the offset, and increases the absolute HFN by 1.

The downlink data receiver 304 receives downlink data from an RLC layer, and provides the received downlink data to the ciphering processor 306.

The ciphering processor 306 ciphers the downlink data provided from the downlink data receiver 304 using a function f8 provided by the 3$^{rd}$ Generation Partnership Project (3GPP) standard, and then provides the ciphered downlink data to the downlink data transmitter 308. At this point, the ciphering processor 306 changes or maintains a CFN and an HFN forming COUNT-C, which is a parameter of the function f8, using information provided from the ToA reception/determination unit 300 and the offset calculator 302. That is, the ciphering processor 306 starts ciphering using an absolute HFN value set to the same as that of a terminal during a synchronization procedure, determines a transmission HFN depending on the size of an offset provided from the offset calculator 302, and uses the determined transmission HFN in performing the ciphering. When the sum of an offset provided from the offset calculator 302 and an absolute CFN is greater than or equal to 0, and less than 256, the ciphering processor 306 uses the absolute HFN as a transmission HFN. When the sum of the offset and the absolute CFN is less than 0, the ciphering processor 306 decreases the absolute HFN by 1, and uses it as a transmission HFN. When the sum of the offset and the absolute CFN is greater than or equal to 256, the ciphering processor 306 increases the absolute HFN by 1, and uses it as a transmission HFN.

The downlink data transmitter 308 transmits downlink data provided from the ciphering processor 306 to a Frame Protocol (FP).

Figure 4A:
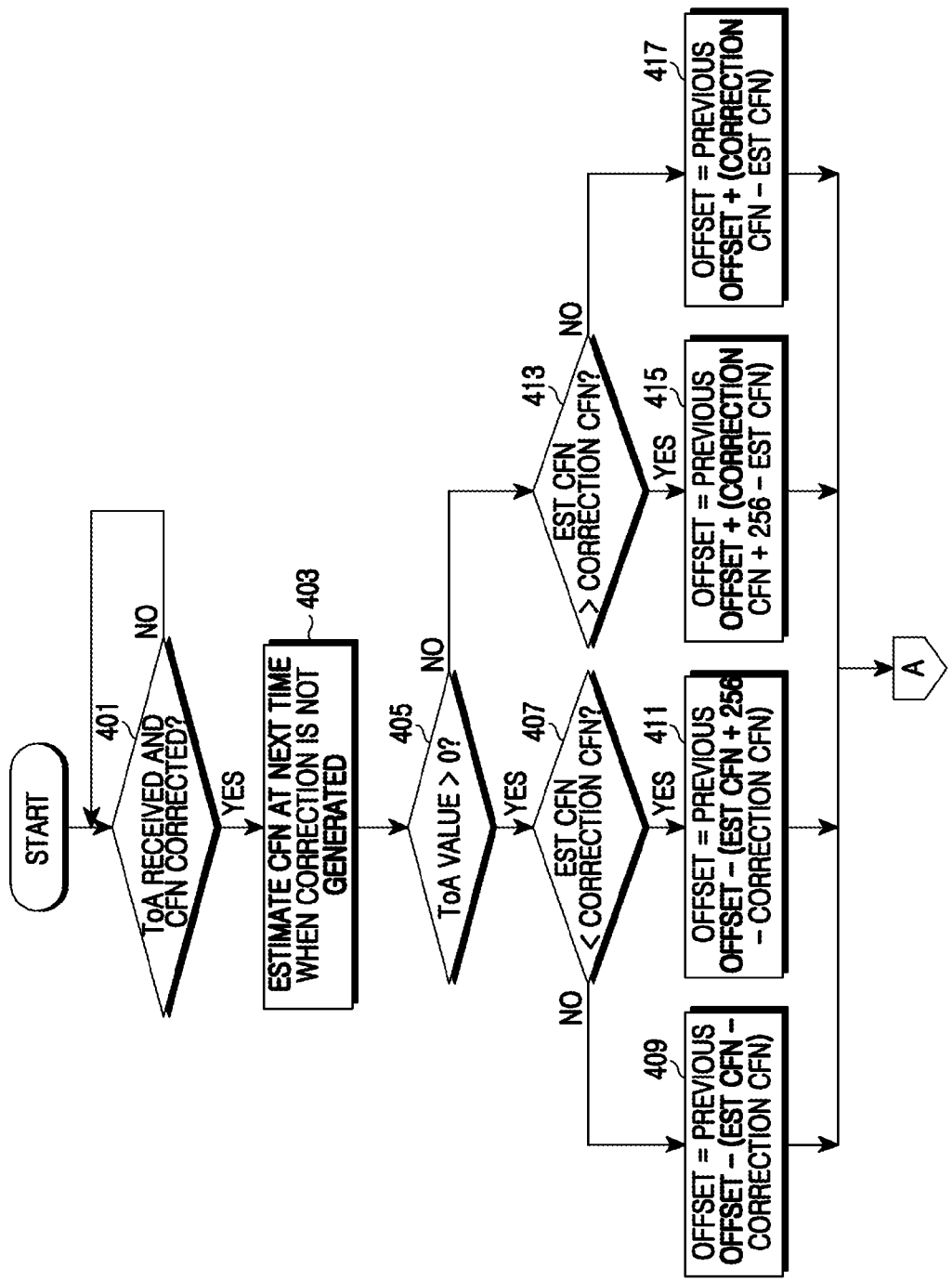
FIGS. 4A and 4B are diagrams illustrating a method of changing an HFN at an RNC of a mobile communication system according to an exemplary embodiment of the present invention.
Figure 4B:
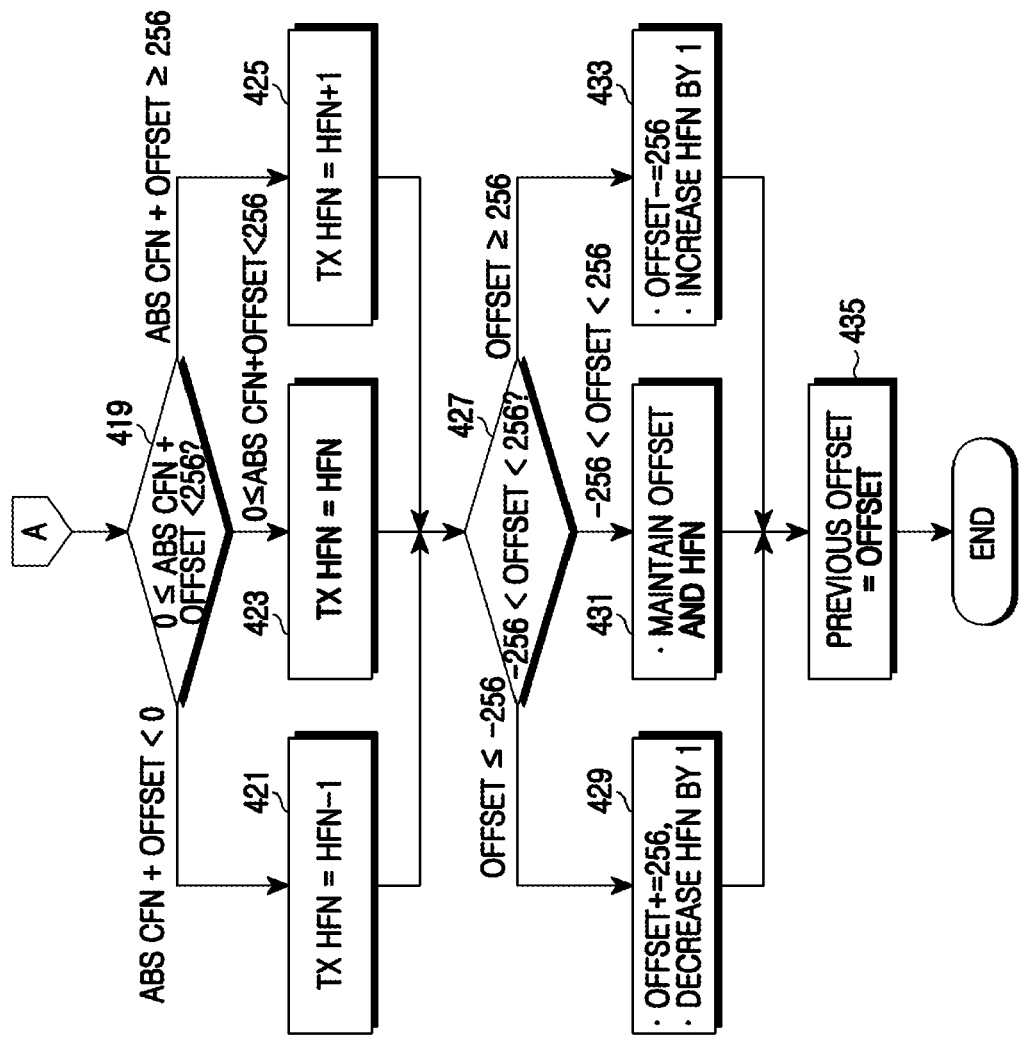

FIGS. 4A and 4B are diagrams illustrating a procedure of changing an HFN at an RNC of a mobile communication system according to an exemplary embodiment of the present invention.

Referring to FIGS. 4A and 4B, when ToA is received from a base station and a CFN is corrected in step 401, the RNC estimates a CFN value to be transmitted at the next point in a case where the correction is not generated in step 403. For example, when a CFN is corrected from 2 to 250, it can be estimated that the CFN increases by 1 every 10 ms and becomes 4 after 20 ms, which is the next point. Here, a CFN value to be transmitted at the next point can be determined using Equation (1).

After that, in step 405, the RNC examines whether the ToA value has a positive value or a negative value. When the ToA value has a positive value, the RNC compares the estimated CFN value with a correction CFN value in step 407. When the estimated CFN value is less than the correction CFN value, the RNC determines an offset using Equation (2) in step 411. When the estimated CFN value is greater than or equal to the correction CFN, the RNC determines an offset using Equation (3) in step 409. On the other hand, when it is determined that the ToA value has a negative value in step 405, the RNC compares the estimated CFN value with a correction CFN value in step 413. When the estimated CFN value is greater than the correction CFN value, the RNC determines an offset using Equation (4) in step 415. And when the estimated CFN value is less than or equal to the correction CFN value, the RNC determines an offset using Equation (5) in step 417.

When the offset is determined, the RNC examines whether the sum of an absolute CFN value and the offset is greater than or equal to 0, and less than 256 in step 419. When the sum of the absolute CFN value and the offset is less than 0, the RNC determines that the correction CFN is a CFN of a previous cycle, and determines, as a transmission HFN, a value obtained by decreasing an absolute HFN by 1 in step 421.

On the other hand, when the sum of the absolute CFN value and the offset is greater than or equal to 0, and less than 256, the RNC determines the correction CFN is a CFN of a current cycle, and maintains a transmission HFN by determining an absolute HFN as a transmission HFN in step 423.

Finally, if the sum of the absolute CFN value and the offset is greater than or equal to 256, the RNC determines the correction CFN is a CFN of the next cycle, and determines, as a transmission HFN, a value obtained by increasing an absolute HFN by 1 in step 425.

In step 427, the RNC examines whether the offset is greater than −256 and less than 256. When the offset is less than −256, the RNC adds 256 to the offset and decreases an absolute HFN by 1 in step 429. On the other hand, when the offset is greater than −256 and less than 256, the RNC maintains the offset and the absolute HFN in step 431. Meanwhile, when the offset is greater than 256, the RNC subtracts 256 from the offset in step 433.

In step 435, the RNC sets the offset on which addition or subtraction has been performed, or the maintained offset, as a previous offset, and ends an algorithm according to an exemplary embodiment of the present invention.

Now, an exemplary method of changing or maintaining an HFN is described with reference to FIGS. 5 to 8. Here, it is assumed that a CFN increases on a voice service basis, having a Transmission Time Interval (TTI) of 20 ms.

First, the fact that a ToA value which the RNC receives from a base station is a positive number indicates that when the RNC transmits a downlink data frame using an estimated CFN, the downlink data frame arrives before a reception window of the base station. At this point, when a correction CFN is greater than an estimated CFN in the circumstance that the downlink data frame arrives before the reception window, the correction CFN is a value corresponding to the cycle of a previous CFN. Therefore, an HFN value of a previous cycle should be used as a transmission HFN. The transmission HFN value should be increased again and the transmission HFN value that has been used before correction should be used after a ciphering activation time or at a time at which the correction CFN passes to the next cycle.

Figure 5:
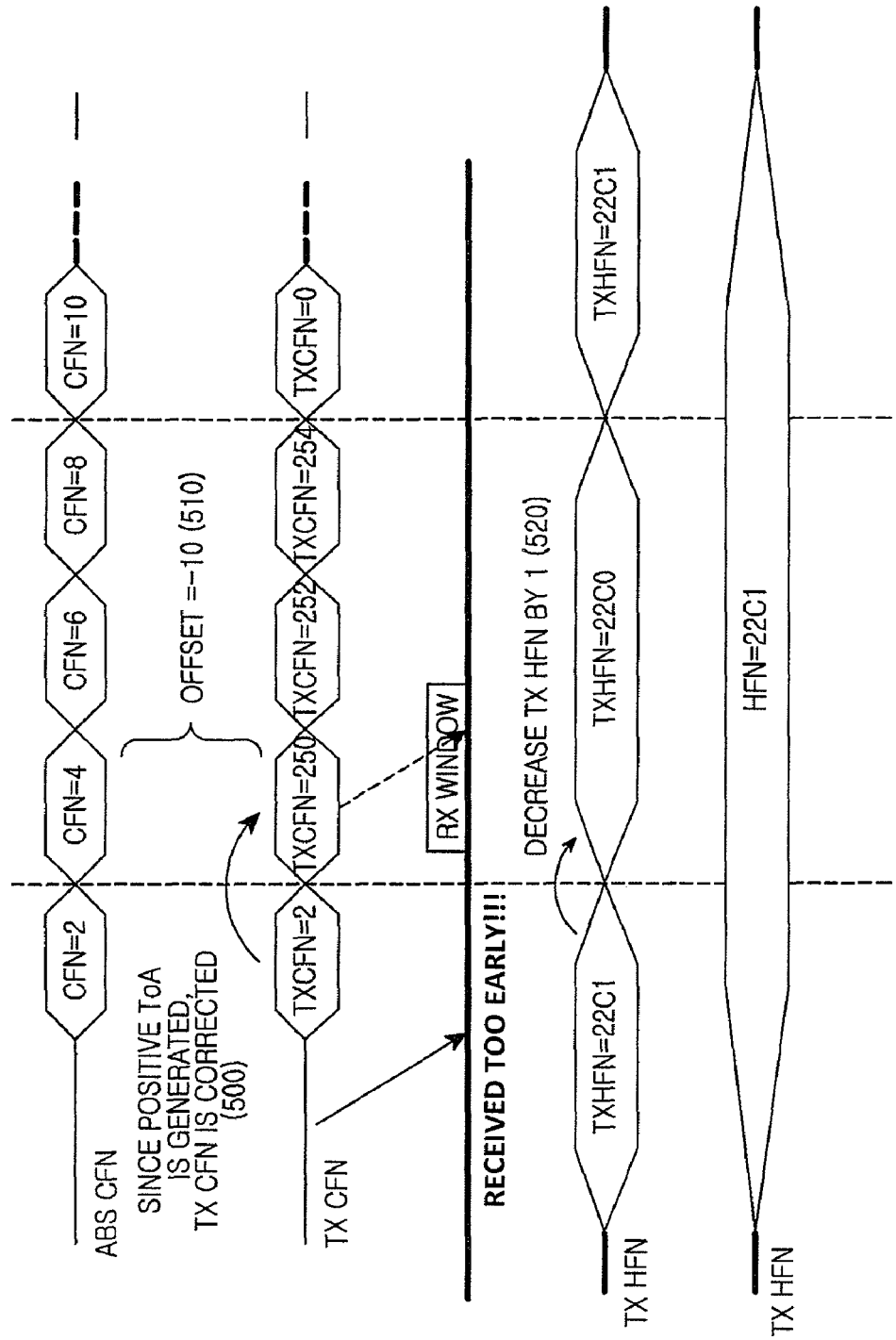
FIG. 5 is a diagram illustrating a method of changing an HFN in a case where a ToA value is positive and an estimated CFN is less than a correction CFN according to an exemplary embodiment of the present invention.

FIG. 5 is a diagram illustrating a method of changing an HFN in a case where a ToA value is positive and an estimated CFN is less than a correction CFN according to an exemplary embodiment of the present invention.

Referring to FIG. 5, a case where ToA having a positive value is received and a transmission CFN is corrected (500) to 250 in the circumstance that both an absolute CFN and the transmission CFN are 2 because CFN correction has not been made before, is described. Here, since the transmission CFN and the absolute CFN have the substantially same value before correction, an estimated CFN becomes 4, which is the substantially same value of an absolute CFN at the next point. In this circumstance, since the ToA has a positive value and the estimated CFN is 4, which is less than the correction CFN of 250, the RNC can obtain an offset (510) having a value of −10 using Equation (2), and can determine that the correction CFN corresponds to the cycle of a previous CFN using the fact that the sum of the offset and 4, which is an absolute HFN, is −6. Therefore, the RNC uses, as a transmission HFN, 22C0 obtained by decreasing 22C1, which is the absolute HFN, by 1 (520).

Figure 6:
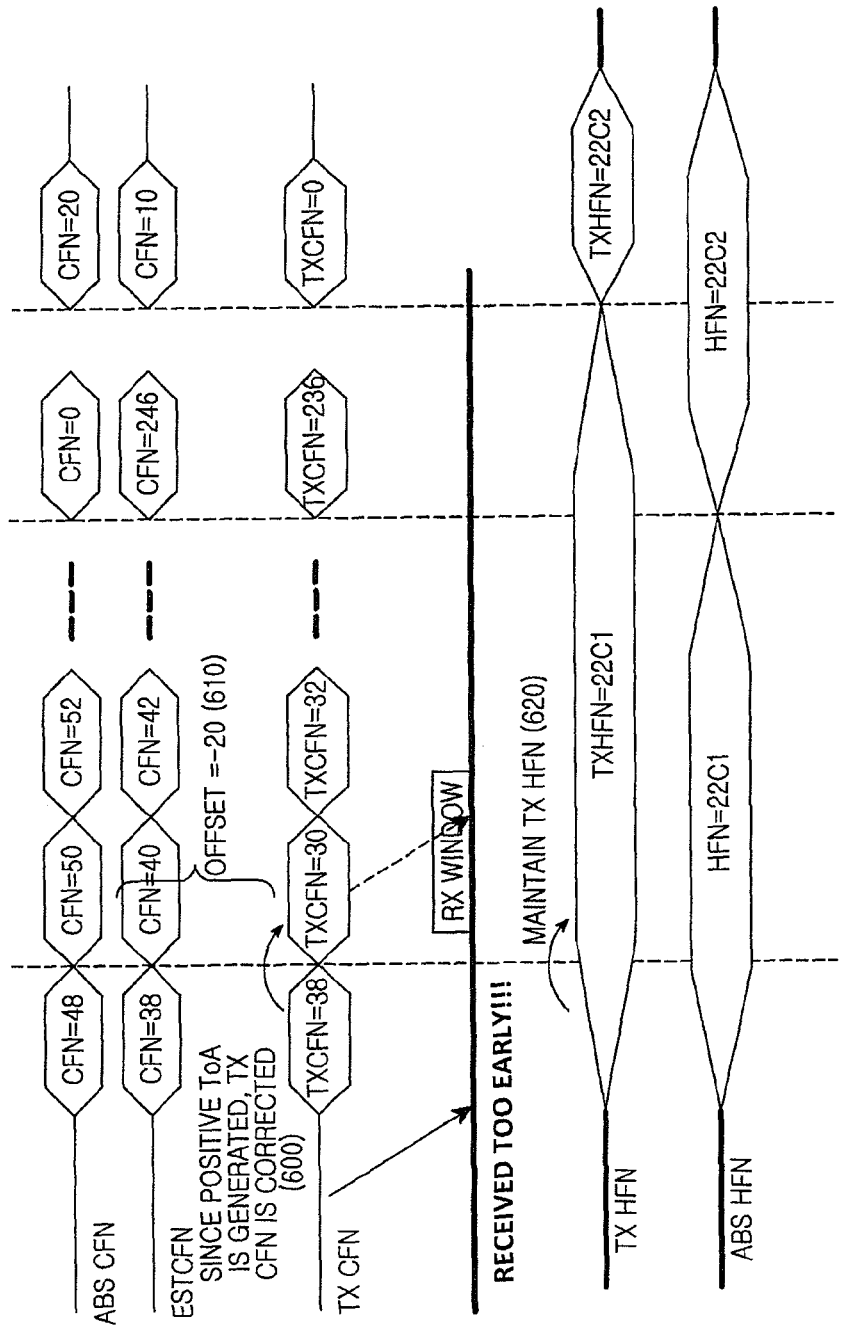
FIG. 6 is a diagram illustrating a method of changing an HFN in a case where a ToA value is positive and an estimated CFN is greater than or equal to a correction CFN according to an exemplary embodiment of the present invention.

FIG. 6 is a diagram illustrating a method of changing an HFN in a case where a ToA value is positive and an estimated CFN is greater than or equal to a correction CFN according to an exemplary embodiment of the present invention. In the circumstance that a ToA value which the RNC receives from a base station is a positive number, that is, in the circumstance that the downlink data frame arrives before a reception window, when an estimated CFN is greater than or equal to a correction CFN, it means that the correction CFN is a value corresponding to the substantially same cycle. Therefore, a transmission HFN should be maintained.

Referring to FIG. 6, a case where ToA having a positive value is received and a transmission CFN is corrected to 30 (600) in the circumstance that an absolute CFN is 48 and the transmission CFN is 38, is described. At this point, it is assumed that a previous offset is −10. The RNC can recognize that an estimated CFN is 40 using Equation (1). Since the ToA has a positive value and the estimated CFN is 40, which is greater than the correction CFN of 30, an offset (610) having a value of −20 can be obtained using Equation (3). After that, the RNC determines that the correction CFN corresponds to the substantially same cycle using the fact that sum of the offset and an absolute HFN is 30, and thus maintains the transmission HFN (620).

Figure 7:
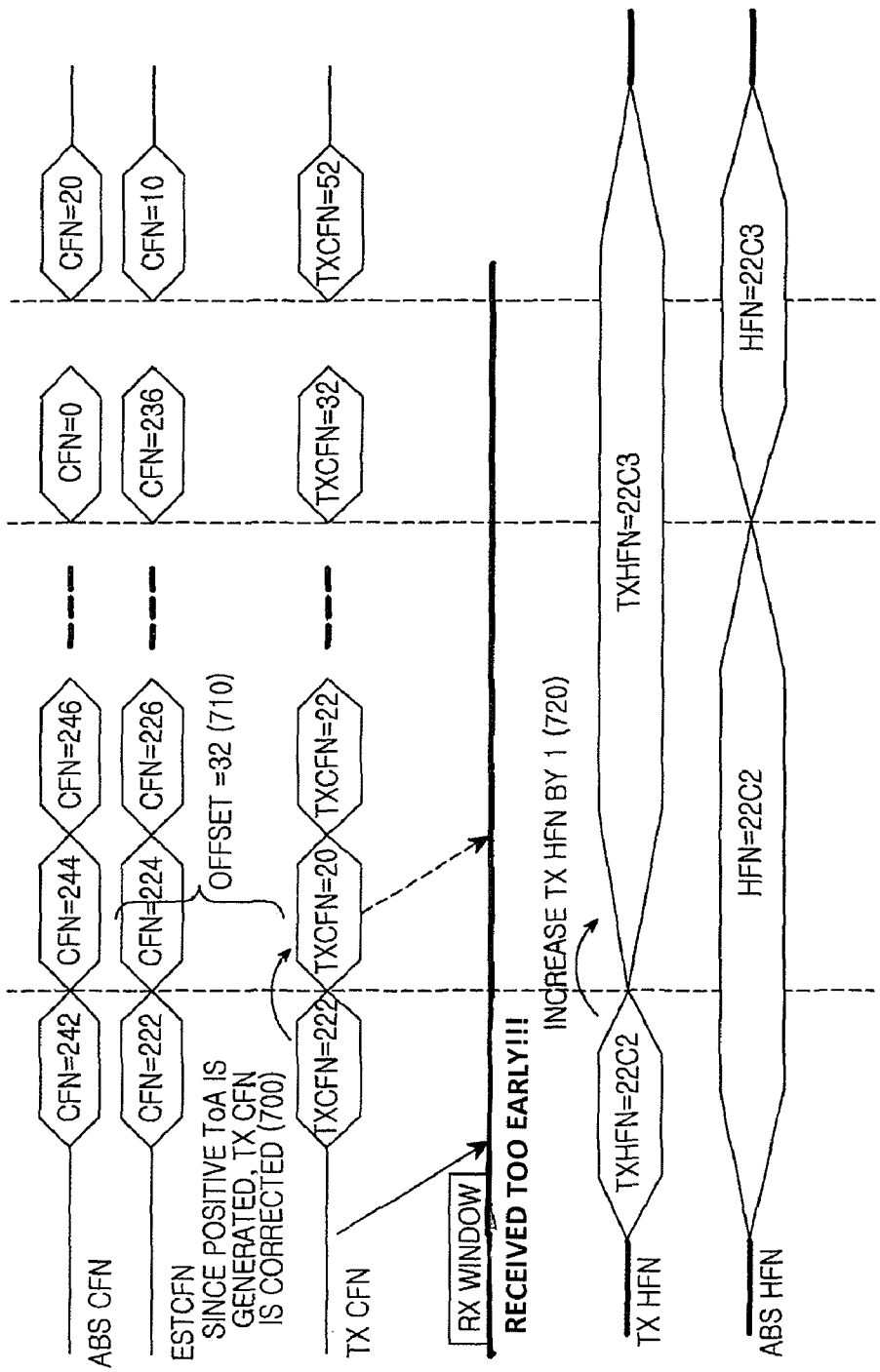
FIG. 7 is a diagram illustrating a method of changing an HFN in a case where a ToA value is negative and an estimated CFN is greater than a correction CFN according to an exemplary embodiment of the present invention.

FIG. 7 is a diagram illustrating a method of changing an HFN in a case where a ToA value is negative and an estimated CFN is greater than a correction CFN according to an exemplary embodiment of the present invention. The fact that a ToA value which the RNC receives from a base station is a negative number indicates that when the RNC transmits a downlink data frame using an estimated CFN, the downlink data frame arrives after the reception window of the base station. At this point, when an estimated CFN is greater than a correction CFN in the circumstance that the downlink data frame arrives after the reception window, it means that the correction CFN is a value corresponding to the cycle of a latter CFN. Therefore, an HFN value of a latter cycle should be used as a transmission HFN.

Referring to FIG. 7, a case where ToA having a negative value is received and a transmission CFN is corrected to 20 (700) in the circumstance that an absolute CFN is 242 and the transmission CFN is 222, is described. At this point, it is assumed that a previous offset is −20. The RNC can recognize that an estimated CFN is 224 using Equation (1). Since the ToA has a negative value and the estimated CFN is 224, which is greater than the correction CFN of 20, an offset (710) having a value of 32 can be obtained using Equation (4). After that, the RNC determines that the correction CFN corresponds to the next cycle using the fact that the sum of the offset and an absolute HFN is 276, and thus uses, as a transmission HFN, 22C3 obtained by increasing 22C2, which is an absolute HFN, by 1.

Figure 8:
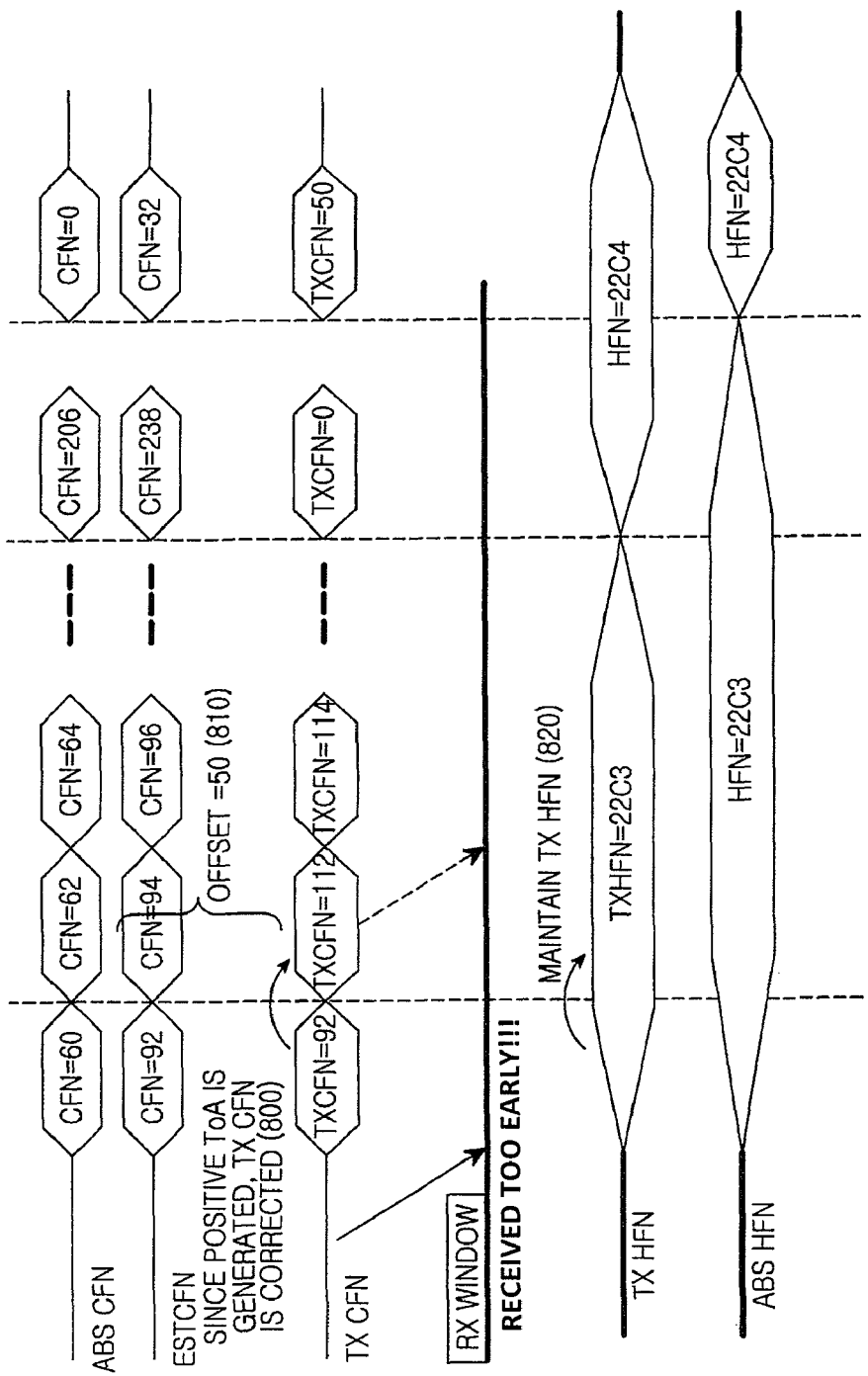
FIG. 8 is a diagram illustrating a method of changing an HFN in a case where a ToA value is negative and an estimated CFN is less than or equal to a correction CFN according to an exemplary embodiment of the present invention.

FIG. 8 is a diagram illustrating a method of changing an HFN in a case where a ToA value is negative and an estimated CFN is less than or equal to a correction CFN according to an exemplary embodiment of the present invention. When the estimated CFN is less than or equal to a correction CFN in the circumstance that a ToA value which the RNC receives from a base station is a negative number, that is, in the circumstance that the downlink data frame arrives after the reception window, it means that the correction CFN is a value corresponding to the substantially same cycle. Therefore, the substantially same transmission HFN should be maintained.

Referring to FIG. 8, a case where ToA having a negative value is received and the transmission CFN is corrected to 112 (800) in the circumstance that an absolute CFN is 60 and a transmission CFN is 92, is described. At this point, it is assumed that a previous offset is −32. The RNC can recognize that an estimated CFN is 94 using Equation (1). Since the ToA has a negative value and the estimated CFN is 94, which is less than the correction CFN of 112, an offset (810) having a value of 50 can be obtained using Equation (5). After that, the RNC determines that the correction CFN corresponds to the substantially same cycle using the fact that the sum of the offset and an absolute HFN is 112, and thus maintains the transmission HFN (820).

Exemplary embodiments of the present invention have an effect of allowing a system and a terminal to maintain the same HFN in order to prevent damage of user data even when CFN correction is frequently generated due to delay generation in an Iub section between an RNC and a base station by changing, at the system, the HFN for ciphering/deciphering using a CFN correction value and a CFN offset value generated due to a delay in the Iub section between the RNC and the base station (node B) in a mobile communication system.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A method for managing a Hyper Frame Number (HFN) for ciphering/deciphering at a Radio Network Controller (RNC) of a mobile communication system, the method comprising:
   receiving a Timing Adjustment (ToA) value from a base station;
   correcting a Connection Frame Number (CFN);
   determining whether correction of the CFN has been generated within the same cycle by comparing a correction CFN with an absolute CFN serving as a reference;
   determining whether to decrease an HFN value and accordingly decreasing the HFN value in accordance with whether the CFN correction has been generated within the same cycle; and
   if it is determined not to decrease the HFN value, one of increasing and maintaining the HFN value in accordance with whether the CFN correction has been generated within the same cycle.

2. The method of claim 1, wherein the absolute CFN serving as the reference comprises a CFN value obtained by performing a synchronization procedure between the RNC and the base station during a call setup, and increases by a preset value every preset time regardless of the ToA value.

3. The method of claim 1, wherein the determining of whether correction of the CFN has been generated within the same cycle comprises:
   determining an offset between the correction CFN and the absolute CFN; and
   examining whether the sum of the absolute CFN and the offset is a value included within a preset range.

4. The method of claim 3, wherein the determining of the offset comprises:
   examining whether the ToA value is a positive number or a negative number;
   when the CFN correction is not generated, estimating a value to be used as a transmission CFN for ciphering at a next point;
   comparing a size of the estimated CFN with that of the correction CFN; and
   determining the offset depending on whether the ToA value is a positive number or a negative number, and depending on a comparison result of sizes of the estimated CFN and the correction CFN.

5. The method of claim 4, wherein the estimating of the value to be used as the transmission CFN for ciphering at the next point comprises using the equation:

$$estCFN=(256+absCFN+prevOffset) \% 256$$

where estCFN denotes an estimated CFN, 256 denotes one cycle of a CFN, absCFN denotes an absolute CFN obtained by performing a synchronization procedure, and prevOffset denotes an offset of a previous point.

6. The method of claim 4, wherein when the ToA value is a positive number and the estimated CFN is less than the correction CFN, the offset is determined using the equation:

Offset=prevOffset−(estCFN+256−txCFN) where prevOffset denotes an offset of a previous point, estCFN denotes an estimated CFN, 256 denotes one cycle of a CFN, and txCFN denotes a correction CFN value, that is, a transmission CFN.

7. The method of claim 4, wherein when the ToA value is a positive number and the estimated CFN is greater than or equal to the correction CFN, the offset is determined using the equation:
   Offset=preOffset−(estCFN−txCFN) where prevOffset denotes an offset of a previous point, estCFN denotes an estimated CFN, and txCFN denotes a correction CFN, that is, a transmission CFN.

8. The method of claim 4, wherein when the ToA value is a negative number and the estimated CFN is greater than the correction CFN, the offset is determined using the equation:

$$Offset=prevOffset+(estCFN+256-txCFN)$$

where prevOffset denotes an offset of a previous point, estCFN denotes an estimated CFN, 256 denotes one cycle of a CFN, and txCFN denotes a correction CFN, that is, a transmission CFN.

9. The method of claim 4, wherein when the ToA value is a negative number and the estimated CFN is less than or equal to the correction CFN, the offset is determined using the equation:

$$Offset=prevOffset+(estCFN-txCFN)$$

where prevOffset denotes an offset of a previous point, estCFN denotes an estimated CFN, and txCFN denotes a correction CFN, that is, a transmission CFN.

10. The method of claim 3, wherein the one of changing and maintaining of the HFN value comprises:
    examining whether the sum of the absolute CFN and the offset is greater than or equal to 0, and less than 256;
    when the sum is greater than or equal to 0, and less than 256, maintaining the HFN value;
    when the sum is less than 0, decreasing the HFN value by 1; and
    when the sum is greater than or equal to 256, increasing the HFN value by 1.

11. An apparatus for managing a Hyper Frame Number (HFN) for ciphering/deciphering at a Radio Network Controller (RNC) of a mobile communication system, the apparatus comprising:
    a Timing Adjustment (ToA) receiver for receiving a ToA value for correcting a Connection Frame Number (CFN) from a base station; and
    a ciphering processor for determining whether CFN correction has been generated within the same cycle using a correction CFN and an absolute CFN serving as a reference, and for performing ciphering of downlink data by determining whether to decrease an HFN value and accordingly decreasing the HFN value in accordance with whether the CFN correction has been generated within the same cycle, and if it is determined not to decrease the HFN value, one of increasing and maintaining the HFN value in accordance with the determination of whether the CFN correction has been generated within the same cycle.

12. The apparatus of claim 11, wherein the absolute CFN serving as the reference comprises a CFN value obtained by performing a synchronization procedure between the RNC and the base station during a call setup, and increases by a preset value every preset time regardless of the ToA value.

13. The apparatus of claim 11, further comprising an offset calculator for determining an offset between the correction CFN and the absolute CFN, wherein the ciphering processor determines whether the correction of the CFN has been generated within the same cycle depending on sum of the absolute CFN and the offset is a value included within a preset range.

14. The apparatus of claim 13, wherein the offset calculator examines whether the ToA value is a positive number or a negative number and, when the CFN correction is not generated, estimates a value to be used as a transmission CFN for ciphering at a next point, and compares a size of the estimated CFN and that of the correction CFN to determine the offset depending on a comparison result.

15. The apparatus of claim 14, wherein the offset calculator estimates the value to be used as the transmission CFN for ciphering at the next point using the equation:

$$estCFN = (256 + absCFN + prevOffset) \% 256$$

where estCFN denotes an estimated CFN, 256 denotes one cycle of a CFN, absCFN denotes an absolute CFN obtained by performing a synchronization procedure, and prevOffset denotes an offset of a previous point.

16. The apparatus of claim 14, wherein when the ToA value is a positive number and the estimated CFN is less than the correction CFN, the offset calculator determines the offset using the equation:

$$Offset = prevOffset - (estCFN + 256 - txCFN)$$

where prevOffset denotes an offset of a previous point, estCFN denotes an estimated CFN, 256 denotes one cycle of a CFN, and txCFN is a correction CFN value, that is, a transmission CFN.

17. The apparatus of claim 14, wherein when the ToA value is a positive number and the estimated CFN is greater than or equal to the correction CFN, the offset calculator determines the offset using the equation:

$$Offset = preOffset - (estCFN - txCFN)$$

where prevOffset denotes an offset of a previous point, estCFN denotes an estimated CFN, and txCFN denotes a correction CFN, that is, a transmission CFN.

18. The apparatus of claim 14, wherein when the ToA value is a negative number and the estimated CFN is greater than the correction CFN, the offset calculator determines the offset using the equation:

$$Offset = prevOffset + (estCFN + 256 - txCFN)$$

where prevOffset denotes an offset of a previous point, estCFN denotes an estimated CFN, 256 denotes one cycle of a CFN, and txCFN denotes a correction CFN value, that is, a transmission CFN.

19. The apparatus of claim 14, wherein when the ToA value is a negative number and the estimated CFN is less than or equal to the correction CFN, the offset calculator determined the offset using the equation:

$$Offset = prevOffset + (estCFN - txCFN)$$

where prevOffset denotes an offset of a previous point, estCFN denotes an estimated CFN, and txCFN denotes a correction CFN, that is, a transmission CFN.

20. The apparatus of claim 13, wherein the ciphering processor maintains the HFN value when the sum is greater than or equal to 0 and less than 256, decreases the HFN value by 1 when the sum is less than 0, and increases the HFN value by 1 when the sum is greater than or equal to 256.

\* \* \* \* \*